June 29, 1971   R. G. FORDYCE ET AL   3,589,961

PROCESS OF FORMING A MATRIX

Original Filed Dec. 19, 1963   4 Sheets-Sheet 1

REID G. FORDYCE
DAVID D. MAC PHAIL
INVENTOR.

BY *Paul E. Sullivan*
ATTORNEY

June 29, 1971   R. G. FORDYCE ET AL   3,589,961
PROCESS OF FORMING A MATRIX

Original Filed Dec. 19, 1963   4 Sheets-Sheet 2

REID G. FORDYCE
DAVID D. MAC PHAIL
*INVENTOR.*

BY *Paul R Sullivan*
ATTORNEY

June 29, 1971  R. G. FORDYCE ET AL  3,589,961
PROCESS OF FORMING A MATRIX

Original Filed Dec. 19, 1963  4 Sheets-Sheet 3

REID G. FORDYCE
DAVID D. MAC PHAIL
INVENTOR.

BY
ATTORNEY

REID G. FORDYCE
DAVID D. MAC PHAIL
INVENTOR.

BY *Paul C. Sullivan*
ATTORNEY

United States Patent Office 3,589,961
Patented June 29, 1971

3,589,961
PROCESS OF FORMING A MATRIX
Reid G. Fordyce, Springfield, Mass., and David D. MacPhail, Thompsonville, Conn., assignors to Monsanto Company
Continuation of application Ser. No. 331,672, Dec. 19, 1963. This application Aug. 2, 1967, Ser. No. 658,007
Int. Cl. B41d 1/00
U.S. Cl. 156—220                    4 Claims

ABSTRACT OF THE DISCLOSURE

This invention relates to the method of forming and the resultant matrix from which plastic printing plates may be formed. The matrix comprises a foam-metallic layer laminate wherein the metallic face thereof has been compression molded and wherein the foam is capable of receiving and holding a permanent set.

---

This is a continuation of co-pending application Ser. No. 331,672, filed Dec. 19, 1963 and now abandoned.

The present invention relates generally to a new and useful method of forming a printing plate by use of a novel matrix, and the matrix and corresponding printing plate formed thereby, and more specifically to a new and useful foam polymeric matrix useful in the manufacture of synthetic resin printing plates.

Molds useful in making printing plates for newspapers, magazines, and the like have been made for many years by time-consuming and expensive processes. Typical of these prior art molds are those produced by flat pressing a cellulosic mat containing a high moisture content by means of a metal mold. The cellulosic mat produced thereby must be subsequently dried under conditions that prevent shrinking and deformation. This process is a time consuming, expensive one, particularly with regard to the necessary drying of the cellulosic mat under conditions that prevent shrinking.

In addition, the printing plates now in commercial use which are formed from the cellulosic mats have serious drawbacks. The plates, generally consisting of lead, often lack sufficient detail to be useful in applications involving more sophisticated and permanent reproductions such as periodicals, books or the like. Accordingly, the art has long recognized a need for a more versatile, economical process for forming printing plates, as well as a mold having excellent dimensional stability characteristics.

It has been discovered, in accordance with the present invention, that a foamed polymeric material laminated with a metallic foil not only overcomes the deficiencies of the prior art matrices in regard to dimensional stability, but also permits greater speed and, accordingly, a considerable increase in production. In addition, the matrices of this invention are capable of reproducing in precise detail, type, photographs, and other information by use of any of the conventional transfer procedures now being used to form cellulosic matrices.

The developement of these new and useful foamed polymeric matrices was occasioned by the discovery that certain types of polymeric printing plates, when used in place of lead printing plates were not only cheaper and lighter in weight, but were capable of precision in detail far beyond that of commercial lead printing plates. These polymeric printing plates were in fact capable of producing copy in finer detail than it was possible to obtain in the matrices themselves. Accordingly, it was necessary to develop a matrix which would utilize to full advantage these unusual precision characteristics of the polymeric printing plates.

It is, therefore, an object of the present invention to provide a process of forming a plate for use in the printing, graphic, or reproduction arts by casting a hardenable, moldable, resinous composition in a cellular compressible mold characterized by a metallic film laminated on the face thereof.

It is a further object of this invention to provide a printing plate for use in printing, graphic, or reproduction arts comprising a polymeric ester reaction product of at least one unsaturated dicarboxylic acid and at least one polyhydric alcohol, dissolved in a suitable monomer such as styrene or methyl methacrylate.

It is a still further object of this invention to provide a mold useful for forming printing plates or the like having improved dimensional stability comprising a polymeric foam substrate capable of holding a compressive set and a metallic coating laminated to at least one side of the substrate.

It is a further object of this invention to provide the art with a method of forming printing plates which is less time consuming and far more economical than any heretofore developed.

These and other objects of the invention will become apparent from the following description when read in connection with the accompanying drawings which show a preferred embodiment of the invention.

Figure 1:
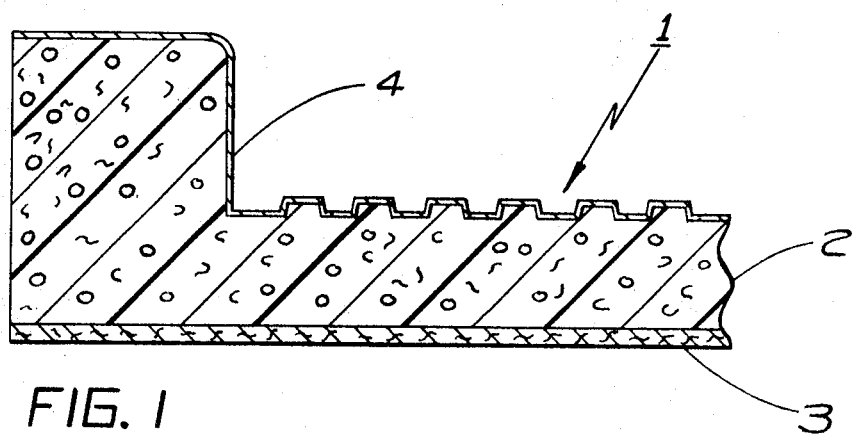
FIG. 1 is a partial sectional view showing a matrix made in accordance with the teaching of this invention.

Referring now to the drawings in more detail and particularly to FIG. 1, the matrix of this invention is designated generally as 1. One of the two principal components of this matrix is the foamed polymer designated as 2. Foamed polymers of the type useful in this invention are generally well known in the art. Any rigid or semi-rigid foam capable of taking a compressive set and holding it may be used as a foamed material in this invention. For example, alkyd resin foams as described in U.S. Pat. 2,740,743, foamed polyurethanes as described in Polyurethanes, by Bernard Dombrow, Rheinhold Publishing Company, 1957, rigid polyvinyl chloride foams, phenolic resin foams, epoxy foams, urea foams, etc. as described in Modern Plastics Encyclopedia, 1962, and polystyrene foams as described in copending application Ser. No. 163,321 filed Dec. 29, 1961 now abandoned, may be used in preparing the resinous foam laminates of this invention in accordance with customary practices. Useful resinous foams are further identified in the references noted in Applied Science and Technology Index, 1960, pages 1031 and 1032, etc. It has been found that thermoplastic styrene polymer foams are most useful in this regard, particularly homopolymers and interpolymers of styrene. The interpolymers of styrene may contain at least 50 weight percent and preferably at least 75 weight percent of styrene with the balance being up to 50 weight percent and preferably up to 25 weight percent of any monomeric compound which will interpolymerize with styrene, particularly those monomeric compounds having the vinylidene group $CH_2{=}C$. These monomeric materials include such compounds as olefins and diolefins, e.g., ethylene, propylene, isobutylene, butadiene, isoprene; unsaturated carboxylic acids and derivatives thereof, e.g., acrylic acid, methacrylic acid, acrylamide, methacrylamide, methacrylonitrile, acrylonitrile, acrylic acid and methacrylic acid esters of alcohols containing 1–18 carbon atoms such as methyl and ethyl methacrylate; other vinylidene aromatic compounds, e.g., alpha-methylstyrene, vinyl toluene, p-ethyl-styrene, 2,4 - dimethylstyrene, o-chlorostyrene, 2,5-dichlorostyrene, vinyl naphthaline, etc. Other monomers which can be interpolymerized with styrene for the purposes of the present invention include alpha-beta-unsaturated polycarboxylic acids and derivatives thereof, e.g., maleic anhydride diethyl maleate, dibutyl fumarate, etc. It may be feasible and desirable to employ blends of two or more of such thermoplastic styrene polymers. The preferred thermoplastic styrene polymers to be employed in the practice of this invention are the homopolymers of styrene having a Staudinger average molecular weight preferably in the range of about 30,000 to about 75,000, though the average molecular weight may vary between 20,000 and 500,000.

The manner in which the foam sheet is formed is not critical and may be done in any of several conventional ways well known in the art. In addition, any of the conventional foaming agents of the prior art may be utilized, for example, aliphatic hydrocarbons such as pentane, isopentane, cyclopentane, etc., certain halogenated aliphatic hydrocarbons such as ethyl chloride, propyl chloride, butyl chloride, isopropyl bromide and particularly the perchlorofluorocarbons such as dichlorodifluoromethane, monochlorotrifluoromethane, trichloromonofluoromethane, 1,1,2,2 - tetrachloro - 1,2-difluoroethane, and the corresponding perchlorofluorocarbons as set forth in U.S. 2,848,428; aliphatic amines such as ethylamine, propylamine, isopropylamine, butylamine, dimethylamine, diethylamine, etc.; aliphatic ethers such as diethyl ether, diisopropyl ether, methyl ethyl ether, ethyl isopropyl ether, etc., acetaldehyde, etc.

A backing material or liner 3 is preferably laminated on the back of the foamed polymer. It has been found that kraft paper is particularly useful as a backing in this regard. Of the commercially available liners, 42 pounds natural kraft linerboard facings have been found to be most suitable though this is by no means critical. The use of this backing and the method of laminating the same to the foamed polymer is more fully described in copending application Ser. No. 163,321 filed Dec. 29, 1961 now abandoned. The backing is optional and any procedure may be employed for laminating the backing to the foam sheet.

The thickness of the resinous foam layers is not critical and may range from very thin to relatively thick layers. Customarily, in practical application, the thickness of the resinous foam layer will range from 25 mils to 250 mils. However, resinous foams ranging from about 40 to 130 mils are more practical for most applications. The density of the resinous foam will customarily range from 1 to 15 pounds per cubic foot. Particularly useful densities range from about 2.0 pounds per cubic foot to 8.0 pounds per cubic foot.

A metallic foil 4 is laminated to the face of foam sheet 2 to complete the matrix. Aluminum foil has been found to be most suitable due to its cost and ready availability, however, any metallic foil capable of withstanding the strain and elongation necessary for the forming operation without tearing or wrinkling could be employed, such as tin foil, tantalum foil, etc. It is, of course, necessary that the foil withstand heat and resist any chemicals present in the casting composition.

Foil thicknesses in the range of about 0.3 mil to about 2 mils have been found to be most advantageous, however, thicknesses outside this range may be used depending upon the depth of indentation in the matrix, foam density, etc. Although it has been found to be most feasible economically to laminate a metallic foil to the foam sheet, it would be within the scope of this invention to coat a metallic layer on the foam sheet in any convenient manner, e.g., by electrodeposition, the only requirement being that a good bond be formed between the foil and the foam or liner unaccompanied by shrinkage or tearing.

In another embodiment of this invention an interlayer of kraft liner, fabric, paper, or the like is laminated between the foam sheet and the metallic foil as an additional support for the metallic layer and to eliminate wrinkling problems which may arise between the metallic layer and the foam sheet. The interlayer may be laminated to either the foam or the metallic foil, the composite body then being laminated to the remaining substrate.

Figure 3:
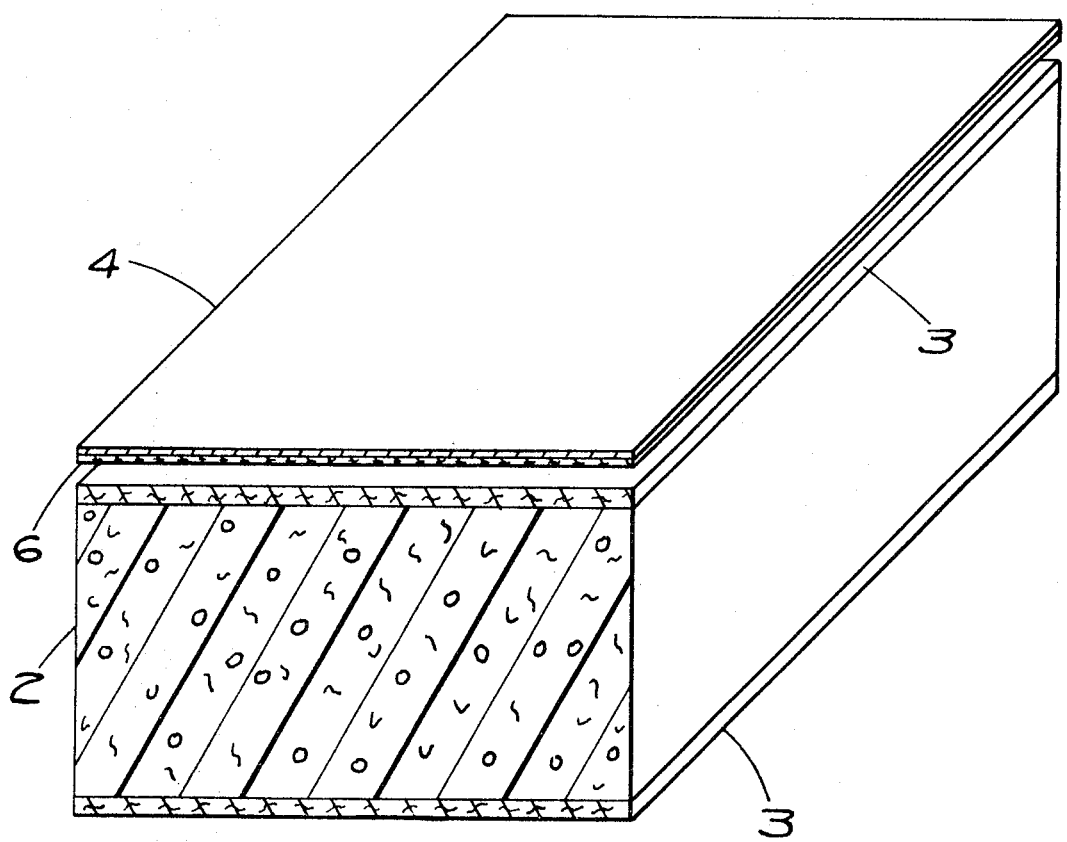
FIG. 3 is a perspective view showing a preferred embodiment of the matrix of this invention.

FIG. 3 illustrates still another embodiment of this invention. It has been found to be advantageous to laminate a metallic foil having a paper backing 6 to a foam sheet having a kraft liner facing. This particular embodiment has proven to be very useful in applications involving extremely rigid precision requirements.

The matrix is pressed or molded in the conventional manner using the identical equipment now being employed to mold cellulosic mats if so desired. This is typically done by use of a flat bed press or rotary press. The sizes and types of dies useful in this regard are numerous. The only limitations in type and character of design to be imparted to the mold are those inherent in the particular die itself. It has been found that the depressions in the matrix are characterized by extreme precision in reproduction of detail, yet the sharp edges of the die produce a corresponding rounded effect in the matrix rather than sharp angles, thereby preventing ripping of the metal foil.

Figure 2:
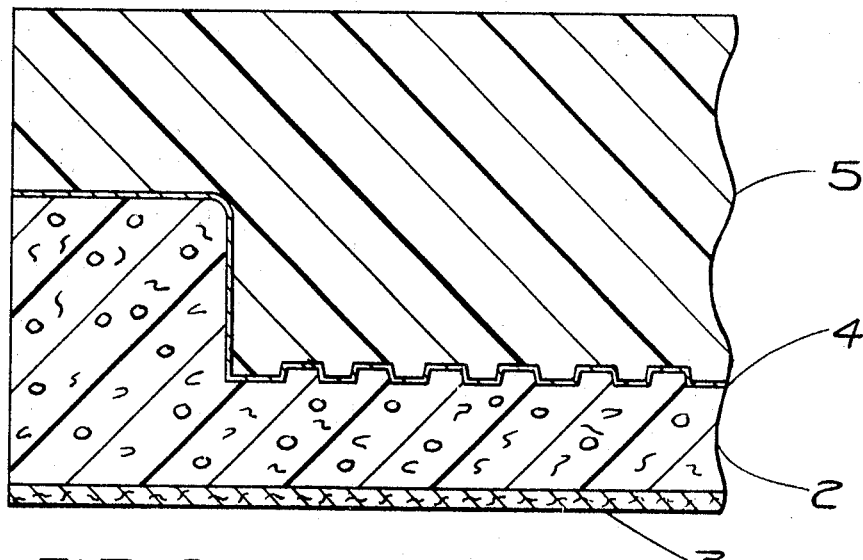
FIG. 2 is a partial sectional view showing a printing plate positioned in the matrix.

Referring now to FIG. 2, the casting composition 5 is shown in position in the mold. The casting composition is easily parted from the mold face with little or no tendency to stick. Though it is entirely unnecessary, any mold lubricant which would not interfere with the necessary fineness in detailed required may be used to aid in separating the casting composition from the mold after curing. As indicated previously, no additional backing is necessary on the foamed sheet.

The plates of this invention are typically used in letterpress printing or the like. However, they are by no means limited to this application. For example, the plates may find equal utility in flexographic or offset processes.

The resinous printing plate is preferably a known polyester resin, though this is not critical. Any of the well known resinous materials capable of polymerizing in situ within reasonably short cure times without giving off volatiles, such as methyl methacrylate, epoxy or phenolic resins may be useful as printing plates in this invention. The preferred polyester resins are polymeric ester reaction products of one or more dicarboxylic acids and one or more polyhydric alcohols. Among the dicarboxylic acids which may be used are phthalic, malic, maleic, fumaric, adipic, pimelic, suberic, sebacic, itaconic, citraconic, succinic acids and their anhydrides. Among the alcohols which may be used are ethylene glycol, di-ethylene glycol, propylene glycol, glycerol, sorbitol, and the like. In addition, mixtures of any of the above are equally satisfactory. One may use an unsaturated monohydric alcohol in place of part of the polyhydric alcohol. A typical example of such an alcohol is allyl alcohol. The casting composition may also contain a monomeric solvent in addition to a polyester resin, in order to make the resin more fluid and to cross-link the polyester resin at the time of curing. The monomeric solvent is consumed during the curing of the polyester resin without forming volatile materials. Among the monomeric solvents useful in this regard are the ethylenically unsaturated hydrocarbons such as styrene, vinyl toluene, cyclopentadiene, vinyl acetate, diallyl esters such as diallyl phthalate, triallyl cyanurate, etc. Of these ethylenically unsaturated materials, styrene has proved to be most satisfactory due to its availability commercially.

Additionally, since this is essentially a vinyl type polymerization, free radical initiators such as peroxides and azo compounds are useful as catalysts to hasten the curing of the polyester resin. Of these, the peroxide catalysts have been found to be more suitable, particularly the aldehyde and ketone peroxides such as methyl ethyl ketone peroxide and cyclohexanone; however, benzoyl peroxide, dicumyl peroxide, fatty oil acid peroxides, etc. are equally useful. The amount of catalyst which will give a cured resin with optimum characteristics depends on many factors, some of which are interdependent. The type of resin, desired curing cycle and dimensions of the printing plate will govern the amounts used, however, 0.1 to 2.0 percent peroxide is preferred, though a smaller amount may be used.

Any of numerous additives may be employed in conjunction with this composition, for example, cobalt in the form of octoate, hexoate, or naphthanate has been found to be a particularly useful activator for fast cures at low temperatures. Concentrations of up to 300 parts per million may be used in this connection.

Occasionally it has been found desirable to produce printing plates having different colors and shades within the plate. In accordance with the teachings of this invention, commercially available dyes generally used in casting resins may be admixed in the casting composition as desired, the only limitation being that the colorant be resistant to the action of additives and not interfere with the cure of the resins.

The temperature at which polymerization is initiated will depend upon the thermal conductivity of the mass and the mold, dimensions of the article, heat transfer coefficiency, and the temperature of the surroundings. Accordingly, the particular combination of catalysts and promoter as well as polymerization temperature will depend greatly upon the size of the printing plate desired.

Figure 6:
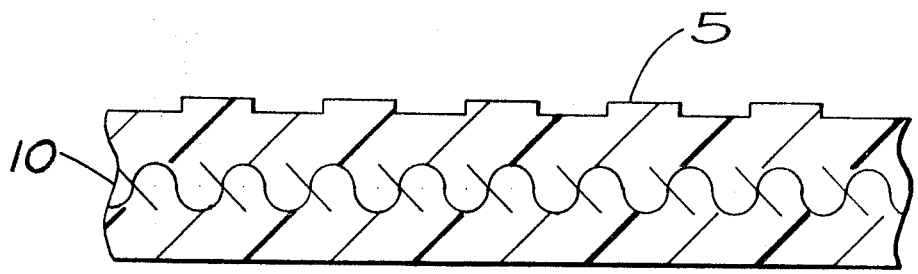
FIG. 6 is a partial sectional view showing one embodiment of the plate of this invention.
Figure 4:
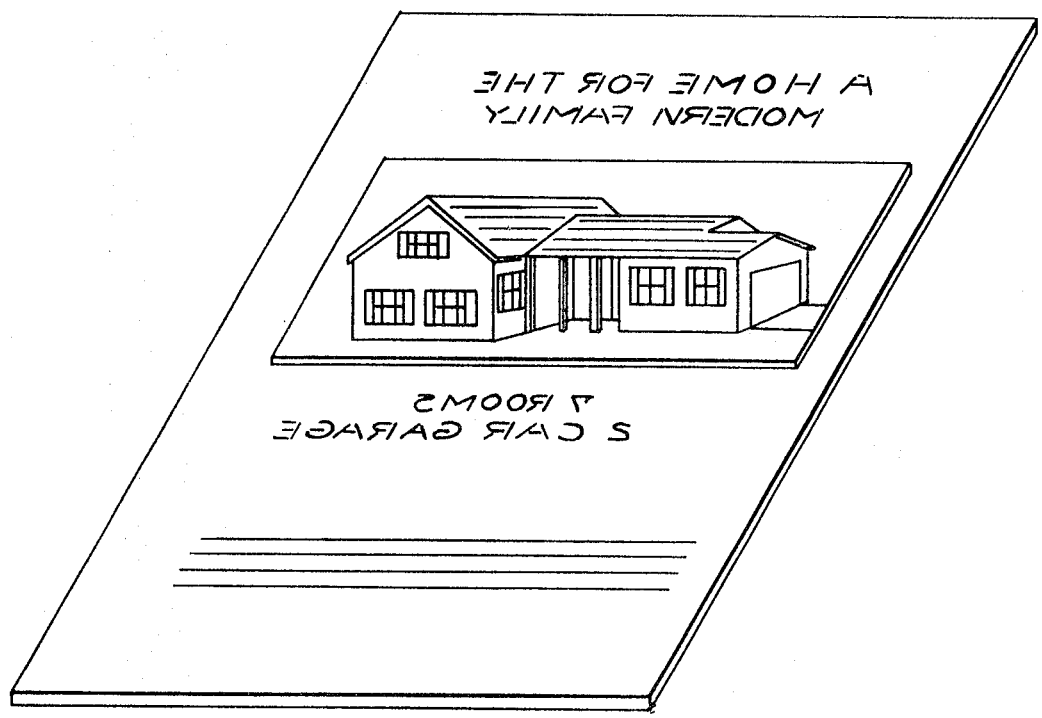
FIG. 4 is a perspective drawing showing the finished printing plate.

The preferred polyester casting compounds may, in addition, be compounded with the conventional fillers and auxiliary agents well known in the art. Mineral fillers, such as, asbestos, clay, calcium carbonate, titanium dioxide, etc. are common. Highly porous absorbent sheets have been found to be particularly useful to prevent shrinkage and as a reinforcing filler in this regard. In one embodiment of this invention, a porous, absorbent, high alpha cellulose photographic grade sheet having a tickness of about 30 to 100 mils is placed adjacent the matrix and the fluid casting composition is metered into the matrix, thereby substantially surrounding the cellulosic sheet. The resultant printing plate, illustrated in FIG. 6, with the cellulosic sheet 10 embedded therein is characterized by a high degree of dimensional stability. Any natural or synthetic fibrous material capable of withstanding the curing operation and chemical action of the casting composition may be equally suitable, such as rayon or nylon.

In practice, the casting compositions are often formulated by mixing all the ingredients in suitable proportions except for the catalyst. The mixture, preferably with a conventional inhibitor such as p-tert-butyl catechol or hydroquinone added, may be stored until ready for use. At that time, a catalyst is added and the mixture is metered into the appropriate mold. Moderate heat is then applied in conventional manner until the resin is cured. The following examples will serve to illustrate one embodiment of this invention:

EXAMPLE I

A liquid mixture of reactive copolymers of styrene and unsaturated alkyd resin (prepared by reacting fumaric or maleic acid with glycol) in the proportions of about 60 percent by weight of styrene to about 40 percent by weight of alkyd resin, and containing about 1 percent by weight of benzoyl peroxide, slurried with an equal weight of monomer, is prepared for metering to the heated printing plate mold.

A polystyrene foam sheet with 42 pound natural kraft facings laminated to both sides and having an average gauge thickness of 70 mils and a foam density of 8 pounds per cubic foot is laminated with paper-backed aluminum foil, then formed into a printing plate matrix in a flat bed press using a metal master mold. The press is operated under sufficient pressure to leave impressions in the metallic face of the matrix having depts ranging from 35 to 50 mils or at least about 30 mils.

Figure 5:
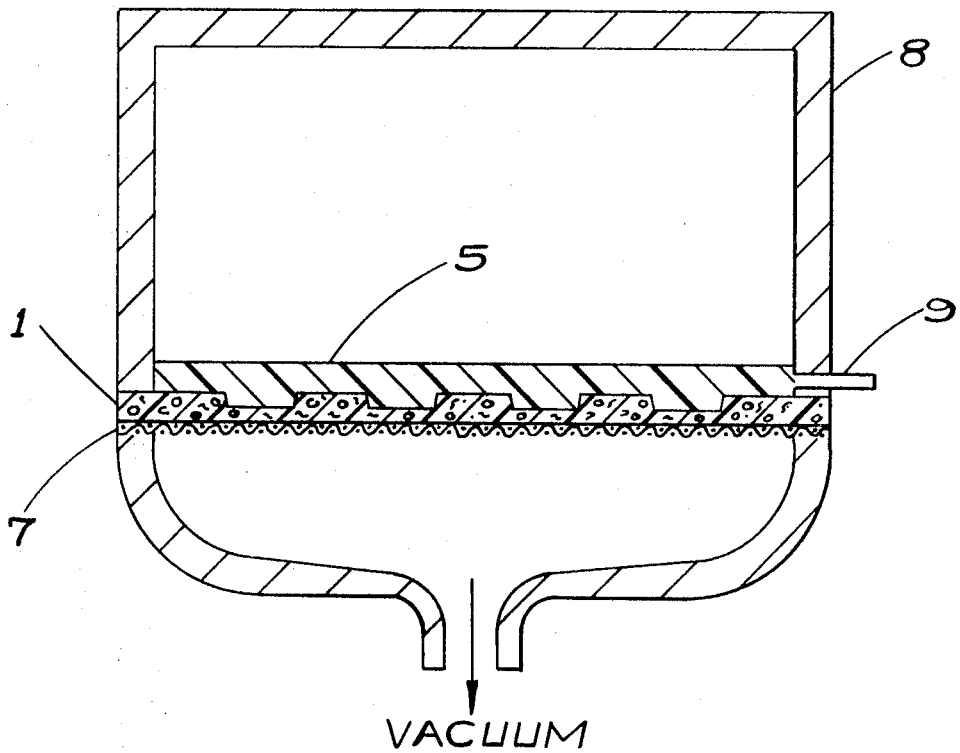
FIG. 5 is a schematic drawing illustrating a process of forming the printing plate in accordance with this invention.

Referring now to FIG. 5, the matrix 1, is placed over a flat stainless steel screen 7 which serves as the bottom of the casting box. A casting box 8, having four sides and a cover swings mechanically into position holding the four sides of the matrix tight against leaks. The casting box may contain an internal plate against which the polyester composition is cast. This plate which is carefully aligned with the matrix assists in precise control of thickness. Vacuum is applied to the screen side of the box and the steel screen is heated by resistance heating. Alternatively, heat can be supplied by resistance heating of the matrix foil face. A reinforcing sheet is placed in the mold, and the polyester casting composition containing styrene monomer, catalyst, and a suitable dye is then metered through conduit 9, by means of a metering pump or the like, into the mold. After a cure cycle of about 4 minutes at 110° C., the plastic printing plate is stripped from the mold and is ready for installation in the printing press.

EXAMPLE II

The process of Example I is repeated except that the casting composition is Polylite 8,000, which is believed to be a 100 percent reactive copolymer of styrene with unsaturated alkyd resins manufactured by Reichhold Chemicals, Inc.

EXAMPLE III

Example I is repeated except that the casting composition is a blend of 25 parts by weight of flexible Polylite Polyester Resin 8150 with 75 parts by weight of Polylite 8001 (both of which are resins believed to be 100 percent reactive copolymers of styrene with unsaturated alkyd resins).

It has been found that the matrices prepared in accordance with the teachings of this invention are superior to the conventional cellulosic matrices now in use in several aspects. In addition to completely eliminating the need for any drying steps, these matrices have excellent dimensional stability, improved parting characteristics, and are able to withstand abuse in handling far beyond that of the conventional matrices. The precision in detail possible with these matrices far exceeds those presently being used in the production of lead printing plates.

The printing plates formed in the molds of this invention possess numerous advantages over lead printing plates, rubber printing plates, and printing plates made from other materials now commercially available. In addition to being less expensive, these plates spread ink uniformly with less ink deposited on the plates. The plates are easily mounted on any size cylinder, and because of their flexibility will compensate for rough surfaces and pressure irregularities. The plates are also very wear-resistant so that the number of good printed copies possible is several times that achievable with lead plates. The process of making the plates is relatively simple and inexpensive, while the plates themselves are lighter in weight and therefore less cumbersome to handle.

The plates made in accordance with this invention also show excellent chemical and corrosion resistance to any of the inks in commercial use, even at elevated temperatures and pressures. Generally, these plates have proved to be outstanding in all respects in comparison with lead printing plates now commercially available.

While in the foregoing specification specific structures and steps have been set out in considerable detail for the purpose of illustrating the invention, it will be understood that such details of structure and procedure may be varied widely by those skilled in the art without departing from the spirit of this invention.

We claim:
1. A process of forming a matrix for use in making a printing plate comprising the steps of:
providing a substrate of a rigid or semi-rigid previously foamed polymeric material capable of taking and holding a compressive set, laminating thereto a metallic layer having a thickness of from 0.3 to 2 mils and forming a depression in the metallic face of the resultant laminate corresponding to that desired to be reproduced by said printing plate, said depression being formed in the laminate by molding the laminate to sufficient pressure to produce a final depression depth in the order of 30 mils.

2. A process according to claim 1 including the step of laminating a paper liner to at least one side of said foam material.

3. A process according to claim 1 wherein said polymeric foam material is a monovinyl aromatic polymerization product having a foam density in the range of from about 2 pounds per cubic foot to about 8 pounds per cubic foot.

4. A process according to claim 1 wherein said metallic layer is aluminum foil having a paper backing thereon.

References Cited
UNITED STATES PATENTS

| | | | |
|---|---|---|---|
| 1,540,444 | 6/1925 | Willis | 264—219 |
| 2,917,217 | 12/1959 | Sisson | 229—4.5 |
| 3,170,832 | 2/1965 | Wilson et al. | 161—119 |
| 3,180,778 | 4/1965 | Rinderspacher et al. | 156—311 |

WILLIAM A. POWELL, Primary Examiner

U.S. Cl. X.R.

101—401.1, 401.2; 161—119, 124, 160, 400; 264—220, 293, 299